United States Patent [19]

Lee et al.

[11] 4,405,495
[45] Sep. 20, 1983

[54] CATALYST IMPREGNATED ON FINE SILICA, PROCESS FOR PREPARING, AND USE FOR ETHYLENE POLYMERIZATION

[75] Inventors: Kiu H. Lee, South Charleston, W. Va.; Gary S. Cieloszyk, Somerville, N.J.

[73] Assignee: Union Carbide Corporation, Danbury, Conn.

[21] Appl. No.: 163,959

[22] Filed: Jun. 30, 1980

[51] Int. Cl.³ .................... C08F 4/02; C08F 4/64
[52] U.S. Cl. .................... 252/429 B; 526/125; 526/129
[58] Field of Search ..................... 252/429 B

[56] References Cited

U.S. PATENT DOCUMENTS

| | | | |
|---|---|---|---|
| 3,094,568 | 6/1963 | Hay et al. | 252/429 B X |
| 3,381,047 | 4/1968 | Eleuterio et al. | 252/429 B X |
| 3,594,330 | 7/1971 | Delbouille et al. | 252/429 A |
| 3,769,233 | 10/1973 | Hermans et al. | 252/429 B X |
| 3,925,338 | 12/1975 | Ort | 526/124 |
| 3,953,414 | 4/1976 | Galli et al. | 252/429 B X |
| 4,098,979 | 7/1978 | Maemoto et al. | 252/429 B X |
| 4,173,547 | 11/1979 | Graff | 252/429 B |

FOREIGN PATENT DOCUMENTS 4647 10/1979 European Pat. Off. .
767073 11/1976 South Africa .
1490414 11/1977 United Kingdom .
2010870 7/1979 United Kingdom .

Primary Examiner—Patrick Garvin
Attorney, Agent, or Firm—John S. Piscitello

[57] ABSTRACT

An improved catalyst suitable for preparing film grade ethylene copolymers formed from an organo aluminum activator compound and a precursor composition impregnated in very fine particle sized porous silica, said precursor composition having the formula $$Mg_mTi_1(OR)_nX_p[ED]_q$$

wherein R is a $C_1$ to $C_{14}$ aliphatic or aromatic hydrocarbon radical, or COR' wherein R' is a $C_1$ to $C_{14}$ aliphatic or aromatic hydrocarbon radical; X is selected from the group consisting of Cl, Br, I or mixtures thereof; ED is an electron donor compound; m is $\geq 0.5$ to $\leq 56$; n is 0, 1 or 2; p is $\geq 2$ to $\leq 116$; and q is $\geq 2$ to $\leq 85$; and said organo aluminum activator compound having the formula $$Al(R'')_cX'_dH_e$$

wherein X' is Cl or OR'''; R'' and R''' are the same or different and are $C_1$ to $C_{14}$ saturated hydrocarbon radicals; d is 0 to 1.5; e is 1 or 0 and $c+d+e=3$.

25 Claims, 1 Drawing Figure

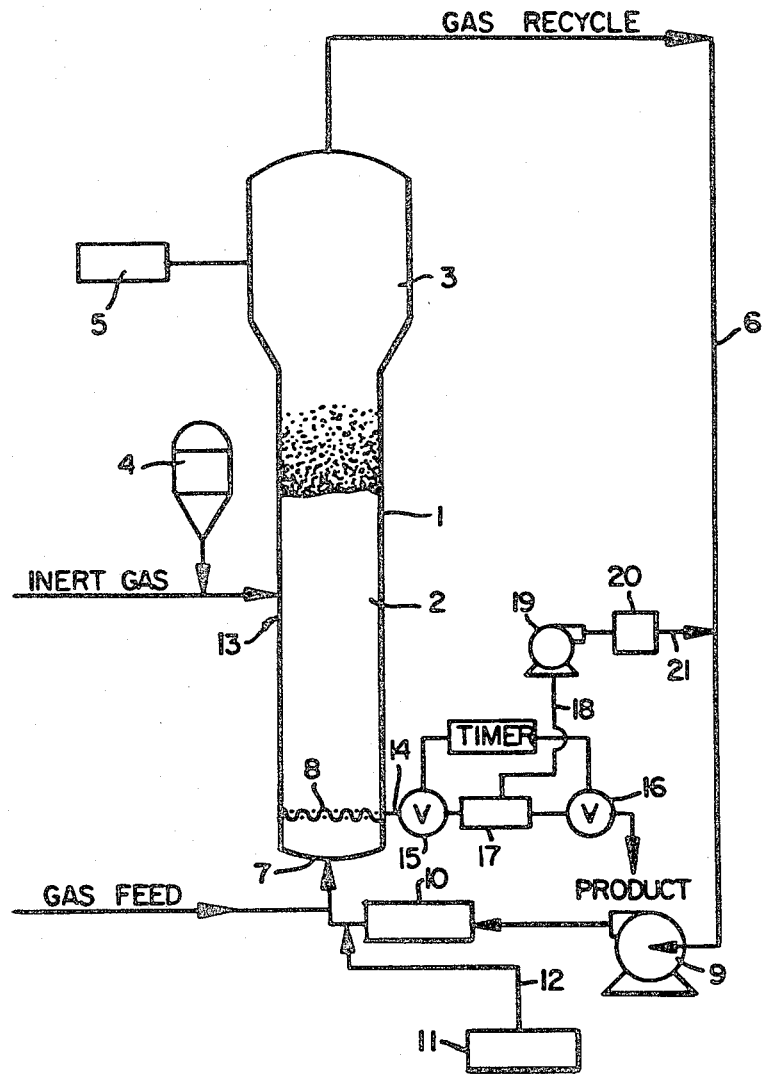

CATALYST IMPREGNATED ON FINE SILICA, PROCESS FOR PREPARING, AND USE FOR ETHYLENE POLYMERIZATION

BACKGROUND OF THE INVENTION

1. Field of the Invention

The invention relates to the catalytic copolymerization of ethylene with high activity, silica supported, Mg and Ti containing catalysts in a gas phase process to produce film grade polymers.

2. Description of the Prior Art

European Patent Application No. 79-100958.2, filed Mar. 3, 1979 and published Oct. 17, 1979 as Publication No. 4647 (EPA Publication 4647), which corresponds to U.S. patent application Ser. No. 12,720, filed Feb. 16, 1979, and now U.S. Pat. No. 4,302,565, in the names of G. L. Goeke et al, discloses the catalytic copolymerization of ethylene with $C_3$ to $C_8$ alpha olefin comonomer to produce film grade resin in the gas phase with certain high activity catalysts. These catalysts are formed from certain organo aluminum compounds and certain precursor compounds. The precursor compounds are formed from certain Ti compounds, Mg compounds and electron donor (ED) compounds. The catalysts are impregnated in porous particulate inert carrier materials. The preferred of such carrier materials is silica.

When used with the particulate silica materials which have been commercially available to date, however, these Ti/Mg/ED containing catalysts have produced ethylene copolymers in the process described in EPA Publication 4647 which, while meeting most of the requirements for film grade resins, still have some deficiencies in the area of film appearance, as measured by a film appearance rating (FAR), due to the presence of gels and other visual imperfections. Thus, while copolymers made by the process of EPA Publication 4647 tend to have an FAR value which will satisfy the needs of many end use film applications for which ethylene polymers are used, certain film applications require the use of films having even higher FAR values. Such latter applications would include uses where the films are to be employed for packaging and/or are to contain printed material.

Various attempts to improve the FAR values of the copolymers, in film form, made with the high activity catalysts and process of EPA Publication 4647, by using one or the other of various types of inert porous supports with such catalysts in such process were not successful, prior to the present invention. Likewise, efforts to upgrade properties such as bulk density, particle size, resin flowability and catalyst productivity, have met with little success.

SUMMARY OF THE INVENTION

It has now been unexpectedly found that ethylene copolymers which, in film form, have excellent mechanical and optical properties, can be produced at relatively high productivities for commercial purposes by a gas phase process if the ethylene is copolymerized with one or more $C_3$ to $C_8$ alpha olefins in the presence of a high activity magnesium-titanium complex catalyst prepared, as described below, under specific activation conditions with an organo aluminum compound and impregnated in porous particulate silica having a relatively small particle size.

An object of the present invention is to provide a process for producing, with relatively high productivities and in a low pressure gas phase process, ethylene copolymers which have, in the form of polymers, a relatively low residual catalyst content, a density of about 0.91 to 0.94, a molecular weight distribution of about 2.5 to 6.0, a bulk density of about 23 to 35, small average resin particle size but low resin fine content, good flow properties, and in film form, excellent FAR values and mechanical properties.

A further object of the present invention is to provide a process in which ethylene copolymers which are useful for a variety of end-use film applications may be readily prepared.

A still further object of the present invention is to provide a variety of novel ethylene copolymers and film products made therefrom.

BRIEF DESCRIPTION OF THE DRAWINGS

The drawing shows a gas phase fluid bed reactor system in which the catalyst system of the present invention may be employed.

DESCRIPTION OF THE PREFERRED EMBODIMENT

It has now been found that the desired ethylene copolymers can be readily produced with relatively high productivities in a low pressure gas phase fluid bed reaction process if the monomer charge is polymerized under a specific set of operating conditions, as detailed below, and in the presence of a specific high activity catalyst which is impregnated on a porous particulate silica of specified particle size, as is also detailed below.

THE ETHYLENE COPOLYMERS

The copolymers which may be prepared with the catalysts of the present invention are copolymers of a major mol percent ($\geq 90\%$) of ethylene, and a minor mol percent ($\leq 10\%$) of one or more $C_3$ to $C_8$ alpha olefins which should not contain any branching on any of their carbon atoms which is closer than the fourth carbon atom. These alpha olefins include propylene, butene-1, pentene-1, hexene-1, 4-methyl pentene-1, heptene-1 and octene-1. The preferred alpha olefins are propylene, butene-1, hexene-1, 4-methyl pentene-1 and octene-1.

The copolymers have a molecular weight distribution of about 2.5 to 6.0, and preferably of about 2.7 to 4.1. The melt flow ratio (MFR) value is another means of indicating the molecular weight distribution value (Mw/Mn) of a polymer. For the copolymers of the present invention, an MFR value range of $\geq 20$ to $\leq 40$ corresponds to a Mw/Mn value range of about 2.5 to 6.0, and an MFR value range of $\geq 22$ to $\leq 32$ corresponds to an Mw/Mn value range of about 2.7 to 4.1.

The copolymers have a density of about $\geq 0.91$ to $\leq 0.94$, and preferably $\geq 0.916$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from comonomer to comonomer, under the same reaction conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The copolymers made in the process of the present invention have a standard or normal load melt index of $\geq 0.0$ to about 100, and preferably of about 0.5 to 80, and a high load melt index (HLMI) of about 11 to about 2000. The melt index of the copolymers which are made in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the copolymer and/or by increasing the hydrogen/monomer ratio. In addition to hydrogen, other chain transfer agents such as dialkyl zinc compounds may also be used to further increase the melt index of the copolymers.

The copolymers of the present invention have an unsaturated group content of $\leq 1$, and usually $\geq 0.1$ or $\leq 0.3$, $C=C/1000$ carbon atoms, and an n-hexane extractables content (at 50° C.) of less than about 3, and preferably of less than about 2, weight percent.

As compared to the homogeneous copolymers of U.S. Pat. No. 3,645,992, the copolymers of the present invention are heterogeneous. They have melting points of about $\geq 121°$ C.

The copolymers of the present invention have a residual catalyst content, in terms of parts per million of titanium metal, of the order of $>0$ to $\leq 10$ parts per million (ppm) at a productivity level of $\geq 100,000$, of the order of $>0$ to $\leq 5$ ppm at a productivity level of $\geq 200,000$, and of the order of $>0$ to $\leq 2$ parts per million at a productivity level of $\geq 500,000$. The copolymers are readily produced in the process of the present invention at productivites of up to about 500,000.

The copolymers of the present invention are granular materials which have an average particle size of the order of about 0.01 to about 0.04 inches, and preferably of about 0.02 to about 0.03 inches, in diameter. The particle size is important for the purposes of readily fluidizing the polymer particles in the fluid bed reactor, as described below. The granular copolymers of the present invention have a bulk density of about 23 to 35 pounds per cubic foot.

In addition to being useful for making film therefrom the copolymers of the present invention are useful in other molding applications.

For film making purposes the preferred copolymers of the present invention are those having a density of about $\geq 0.916$ to $\leq 0.935$, and preferably of about $\geq 0.917$ to $\leq 0.928$; a molecular weight distribution (Mw/Mn) of $\geq 2.7$ to $\leq 4.1$, and preferably of about $\geq 2.8$ to 3.1; and a standard melt index of $>0.5$ to $\leq 5.0$, and preferably of about $\geq 0.7$ to $\leq 4.0$. The films have a thickness of $>0$ to $\leq 10$ mils, and preferably of $>0$ to $\leq 5$ mils, and more preferably of $>0$ to $\leq 1$ mil.

For the injection molding of flexible articles such as houseware materials, the preferred copolymers of the present invention are those having a density of $\geq 0.920$ to $\leq 0.940$, and preferably of about $\geq 0.925$ to $\leq 0.930$; a molecular weight distribution Mw/Mn of $\geq 2.7$ to $\leq 3.6$, and preferably of about $\geq 2.8$ to $\leq 3.1$; and a standard melt index of $\geq 2$ to $\leq 100$ and preferably of about $\geq 8$ to $\leq 80$.

HIGH ACTIVITY CATALYST

The compounds used to form the high activity catalyst used in the present invention comprise at least one titanium compound, at least one magnesium compound, at least one electron donor compound, at least one activator compound and at least one silica material, as defined below.

The titanium compound has the structure $$Ti(OR)_a X_b$$

wherein

R is a $C_1$ to $C_{14}$ aliphatic or aromatic hydrocarbon radical, or COR' where R' is a $C_1$ to $C_{14}$ aliphatic or aromatic hydrocarbon radical, X is selected from the group consisting of Cl, Br, I or mixture thereof, a is 0, 1 or 2, b is 1 to 4 inclusive and $a+b=3$ or 4.

The titanium compounds can be used individually or in combinations thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure $$MgX_2$$

wherein X is selected from the group consisting of Cl, Br, I or mixtures thereof. Such magnesium compounds can be used individually or in combinations thereof and would include $MgCl_2$, $MgBr_2$ and $MgI_2$. Anhydrous $MgCl_2$ is the particularly preferred magnesium compound.

About 0.5 to 56, and preferably about 1.5 to 5, mols of the magnesium compound are used per mol of the titanium compound in preparing the catalysts employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are soluble. The electron donor compounds are known, as such, or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ethers; $C_3$ to $C_6$, and preferably $C_3$ to $C_4$, aliphatic ketones. The most preferred of these electron donor compounds would include methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 10 mols of the electron donor compound are used per mol of Ti.

The activator compound has the structure $Al(R'')_cX'_dH_e$ wherein

X' is Cl, or OR''', R'' and R''' are the same or different and are $C_1$ to $C_{14}$ saturated hydrocarbon radicals, d is 0 to 1.5, e is 1 or 0 and c+d+e=3.

Such activator compounds can be used individually or in combinations thereof and would include $Al(C_2H_5)_3$, $Al(C_2H_5)_2Cl$, $Al(i-C_4H_9)_3$, $Al_2(C_2H_5)_3Cl_3$, $Al(i-C_4H_9)_2H$, $Al(C_6H_{13})_3$, $Al(C_8H_{17})_3$, $Al(C_2H_5)_2H$ and $Al(C_2H_5)_2(OC_2H_5)$.

About 10 to 400, and preferably about 15 to 60, mols of the activator compound are used per mol of the titanium compound in activating the catalysts employed in the present invention.

The silica support which is employed in the present invention should have a particle size distribution within the range of from 2 microns to no more than 80 microns, and should have an average particle size of from 20 microns to 50 microns. Preferably such silica support has a particle size distribution of from 5 microns to no more than 65 microns, and an average particle size of from 25 microns to 45 microns. As the size of the support decreases, the productivity of the supported catalyst system increases, as does the FAR value of film formed from resin produced by the system. This is accompanied by an increase in the bulk density and a decrease in the average particle size of such resin. However, as the support size decreases to below 5 microns, an excessive amount of very fine particle size resin (<50 microns) may be produced which can cause operational difficulties in the fluid bed reactor. Among such difficulties are coating of the reactor walls and plugging of pressure taps with these fine resin particles, as well as entrainment and recycling of such fines in the reactor. For this reason, no more than 5 percent by weight of the silica should have a particle size below 5 microns. It is also preferred that no more than 15 percent by weight of the silica should have a particle size below 10 microns. Likewise, in order to maximize the advantages of the invention, it is preferred that no more than 10 percent by weight of the silica have a particle size greater than 65 microns.

Most desirably, the silica support employed in the present invention has an average pore diameter of greater than 100 Angstrom units, and preferably greater than 150 Angstrom units. It is also desirable for such silica support to have a surface area of $\geq 200$ square meters per gram, and preferably $\geq 250$ square meters per gram. The average pore volume of such silica is preferably from 1.4 ml/g. to 1.8 ml/g.

The carrier material should be dry, that is, free of absorbed water. Drying of the carrier material is carried out by heating it at a temperature of $\geq 600°$ C. Alternatively, the carrier material dried at a temperature of $\geq 200°$ C. may be treated with about 1 to 8 weight percent of one or more of the aluminum alkyl compounds described above. The modification of the support by the aluminum alkyl compounds provides the catalyst composition with increase activity and also improves polymer particle morphology of the resulting ethylene polymers.

CATALYST PREPARATION: FORMATION OF PRECURSOR

The catalyst used in the present invention is prepared by first preparing a precursor composition from the titanium compound, the magnesium compound, and the electron donor compound, as described below, and then impregnating the carrier material with the precursor composition and then treating the impregnated precursor composition with the activator compound as described below.

The precursor composition is formed by dissolving the titanium compound and the magnesium compound in the electron donor compound at a temperature of about 20° C. up to the boiling point of the electron donor compound. The titanium compound can be added to the electron donor compound before or after the addition of the magnesium compound, or concurrent therewith. The dissolution of the titanium compound and the magnesium compound can be facilitated by stirring, and in some instances by refluxing, these two compounds in the electron donor compound. After the titanium compound and the magnesium compound are dissolved, the precursor composition may be isolated by crystallization or by precipitation with a $C_5$ to $C_8$ aliphatic or aromatic hydrocarbon such as hexane, isopentane or benzene. The crystallized or precipitated precursor composition may be isolated, in the form of fine, free flowing particles having an average particle size of about 10 to 100 microns.

When thus made as disclosed above the precursor composition has the formula $$Mg_mTi_1(OR)_nX_p[ED]_q$$

wherein

ED is the electron donor compound, m is $\geq 0.5$ to $\leq 56$, and preferably $\geq 1.5$ to $\leq 5$, n is 0, 1 or 2, p is $\geq 2$ to $\leq 116$, and preferably $\geq 6$ to $\leq 14$, q is $\geq 2$ to $\leq 85$, and preferably $\geq 3$ to $\leq 10$, R is a $C_1$ to $C_{14}$ aliphatic or aromatic hydrocarbon radical, or COR' wherein R' is a $C_1$ to $C_{14}$ aliphatic or aromatic hydrocarbon radical and, X is selected from the group consisting of Cl, Br, I or mixtures thereof.

The subscript for the element titanium (Ti) is the arabic numeral one.

CATALYST PREPARATION: IMPREGNATION OF PRECURSOR IN SUPPORT

The precursor composition is then impregnated, in a weight ratio of about 0.003 to 1, and preferably about 0.1 to 0.33, parts of the precursor composition into one part by weight of the carrier material.

The impregnation of the dried (activated) support with the precursor composition may be accomplished by dissolving the precursor composition in the electron donor compound, and by then admixing the support with the precursor composition to impregnate the support. The solvent is then removed by drying at temperatures of $\leq 60°$ C.

The support may also be impregnated with the precursor composition by adding the support to a solution of the chemical raw materials used to form the precursor composition in the electron donor compound, without isolating the precursor composition from such solution. The excess electron donor compound is then removed by drying or washing and drying at temperatures of $\leq 60°$ C.

ACTIVATION OF PRECURSOR COMPOSITION

In order to be used in the process of the present invention the precursor composition must be fully or completely activated, that is, it must be treated with sufficient activator compound to transform the Ti atoms in the precursor composition to an active state.

It has been found that, in order to prepare a useful catalyst, it is necessary to conduct the activation in such a way that at least the final activation stage must be conducted in the absence of solvent so as to avoid the need for drying the fully active catalyst to remove solvent therefrom.

The precursor composition is first partially activated outside the polymerization reactor with enough activator compound so as to provide a partially activated precursor composition which has an activator compound/Ti molar ratio of about >0 to <10:1, and preferably of about 4 to 8:1. This partial activation reaction is carried out in a hydrocarbon solvent slurry followed by dyring of the resulting mixture, to remove the solvent, at temperatures between 20° to 80° C., and preferably of 50° to 70° C. The resulting product is a free-flowing solid particulate material which can be readily fed to the polymerization reactor. The partially activated and impregnated precursor composition is fed to the polymerization reactor where the activation is completed with additional activator compound which can be the same or a different compound.

The additional activator compound and the partially activated impregnated precursor composition are preferably fed to the reactor through separate feed lines. The additional activator compound may be sprayed into the reactor in the form of a solution thereof in a hydrocarbon solvent such as isopentane, hexane, or mineral oil. This solution usually contains about 2 to 30 weight percent of the activator compound. The additional activator compound is added to the reactor in such amounts as to provide, in the reactor, with the amounts of activator compound and titanium compound fed with the partially activated and impregnated precursor composition, a total Al/Ti molar ratio of $\geq 10$ to 400, and preferably of about 15 to 60. The additional amounts of activator compound added to the reactor react with and complete the activation of the titanium compound in the reactor.

In a continuous gas phase process, such as the fluid bed process disclosed below, discrete portions of the partially activated precursor composition impregnated on the support are continuously fed to the reactor, with discrete portions of additional activator compound needed to complete the activation of the partially activated precursor composition, during the continuing polymerization process in order to replace active catalyst sites that are expended during the course of the reaction.

THE POLYMERIZATION REACTION

The polymerization reaction is conducted by contacting a stream of the monomer(s), in a gas phase process, such as in the fluid bed process described below, and substantially in the absence of catalyst poisons such as moisture, oxygen, CO, $CO_2$, and acetylene with a catalytically effective amount of the completely activated precursor composition (the catalyst) at a temperature and at a pressure sufficient to initiate the polymerization reaction.

In order to achieve the desired density ranges in the copolymers it is necessary to copolymerize enough of the $\geq C_3$ comonomers with ethylene to achieve a level of >0 to 10 mol percent of the $C_3$ to $C_8$ comonomer in the copolymer. The amount of comonomer needed to achieve this result will depend on the particular comonomer(s) employed.

There is provided below a listing of the amounts, in mols, of various comonomers that are copolymerized with ethylene in order to provide polymers having the desired density range (within the range of about 0.91 to 0.94) at any given melt index. The listing also indicates the relative molar concentration, of such comonomers to ethylene, which are in the recycled gas stream of monomers under reaction equilibrium conditions in the reactor.

| Comonomer | mol % needed in copolymer | Gas Stream Comonomer/Ethylene molar ratio |
|---|---|---|
| propylene | >0 to 10 | >0 to 0.9 |
| butene-1 | >0 to 7.0 | >0 to 0.7 |
| pentene-1 | >0 to 6.0 | >0 to 0.45 |
| hexene-1 | >0 to 5.0 | >0 to 0.4 |
| octene-1 | >0 to 4.5 | >0 to 0.35 |

The catalyst system and process of the present invention may also be used to prepare the more specific film forming ethylene copolymers made with three or more monomers which are disclosed in U.S. patent application Ser. No. 049,555, filed June 18, 1979 in the names of W. A. Fraser et al and entitled "High Tear Strength Polymers". These polymers are hereinafter referred to as the HTS copolymers.

The HTS copolymers are interpolymers or copolymers of the monomers $C_2$, $C_a$ and $C_b$, wherein $C_2$ is ethylene, $C_a$ is selected from propylene, butene-1 and mixtures thereof, and $C_b$ is selected from one or more of the $C_5$ to $C_8$ alpha monoolefins which contain no branching closer than the fourth carbon atom. The $C_5$ to $C_8$ monomers include pentene-1, 4-methyl pentene-1, hexene-1, heptene-1 and octene-1. These polymers are heterogeneous.

The $C_2$, $C_a$ and $C_b$ monomer units are believed to be randomly distributed along the polymer chain in the HTS copolymers and do not have the same ethylene/comonomer ratio among the polymer molecules. The molar ratio of $C_a/C_2$ monomer units in the HTS copolymer mass is about 0.006 to 0.09. The molar ratio of $C_b/C_2$ monomer units in the HTS copolymer mass is about 0.003 to 0.07. In addition, the $C_a$ and $C_b$ monomers are also used in such amounts in making the HTS copolymers as to provide in the copolymers a Branch Chain Factor value of about 0.1 to 0.9, and preferably of about 0.2 to 0.8, where the $$\text{Branch Chain Factor} = \frac{\text{number of carbon branches of } C_3 \text{ to } C_6 \text{ length in } HTS \text{ copolymer}}{\text{total number of carbon branches (of } C_1 \text{ to } C_6 \text{ length) in } HTS \text{ copolymer}}$$

The HTS copolymers have a density of about 0.91 to 0.94, and preferably of about 0.915 to 0.930, grams per cubic centimeter, a melt flow ratio of $\geq 22$ to $\leq 36$, and preferably of about $\geq 25$ to $\leq 32$, and a melt index of about 0.5 to 5.0, and preferably of about 0.8 to 4.0, decigrams per minute.

The melt flow ratio (MFR) range of $\geq 22$ to $\leq 36$ corresponds to a $M_2/M_n$ value range of about 2.7 to 4.3, and the MFR range of $\geq 25$ to $\leq 32$ corresponds to a Mw/Mn range of about 2.8 to 3.8.

In compression molded film form the HTS copolymers have a density of about 0.920 have an intrinsic (Elmendorf) tear strength of about 100 to 800. In blown film form these HTS copolymers have an Elmendorft tear strength of about 60 to 600 grams/mil.

The HTS copolymers have an unsaturated group content of $\leq 1$, and usually of $\geq 0.1$ to $\leq 0.6$, C=C/1000 carbon atoms, and an n-hexane extractables content (at 50° C.) of less than about 5.5, and preferably, of less than about 4.0, weight percent.

Unless otherwise stated, as noted above, the HTS copolymers have other properties which are the same as the other copolymers discussed above.

A fluidized bed reaction system which can be used in the practice of the process of the present invention is illustrated in the drawing. With reference thereto the reactor 1 consists of a reaction zone 2 and a velocity reduction zone 3.

The reaction zone 2 comprises a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to about 10 times $G_{mf}$ and more preferably from about 3 to about 6 times $G_{mf}$. $G_{mf}$ is used in the accepted form as the abbreviation for the minimum mass gas flow required to achieve fluidization, C.Y. Wen and Y.H. Yu, "Mechanics of Fluidization", Chemical Engineering Progress Symposium Series, Vol. 62, p. 100–111 (1966).

It is essential that the bed always contains particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially activated precursor composition (impregnated on the SiO2 support) used in the fluidized bed is preferably stored for service in a reservoir 4 under a blanket of a gas which is inert to the stored material, such as nitrogen or argon.

Fluidization is achieved by a high rate of gas recycle to and through the bed, typically in the order of about 50 times the rate of feed of make-up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 5 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned over gas recycle line 6 to the reactor at point 7 below the bed. At that point there is a gas distribution plate 8 above the point of return to aid in fluidizing the bed.

The portion of the gas stream which does not react in the bed constitutes the recycle gas which is removed from the polymerization zone, preferably by passing it into a velocity reduction zone 3 above the bed where entrained particles are given an opportunity to drop back into the bed.

The recycle gas is then compressed in a compressor 9 and then passed through a heat exchanger 10 wherein it is stripped of heat of reaction before it is returned to the bed. The temperature of the bed is controlled at an essentially constant temperature under steady state conditions by constantly removing heat of reaction. No noticeable temperature gradient appears to exist within the upper portion of the bed. A temperature gradient will exist in the bottom of the bed in a layer of about 6 to 12 inches, between the temperature of the inlet gas and the temperature of the remainder of the bed. The recycle is then returned to the reactor at its base 7 and to the fluidized bed through distribution plate 8. The compressor 9 can also be placed downstream of the heat exchanger 10.

The distribution plate 8 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization throughout the bed is, therefore, important. The distribution plate 8 serves this purpose and may be a screen, slotted plate, perforated plate, a plate of the bubble cap type and the like. The elements of the plate may all be stationary, or the plate may be of the mobile type disclosed in U.S. Pat. Nos. 3,298,792. Whatever its design, it must diffuse the recycle gas through the particles at the base of the bed to keep the bed in a fluidized condition, and also serve to support a quiescent bed of resin particles when the reactor is not in operation. The mobile elements of the plate may be used to dislodge any polymer particles entrapped in or on the plate.

Hydrogen may be used as a chain transfer agent in the polymerization reaction of the present invention. The ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the reaction system downstream from heat exchanger 10. Thus, the activator compound may be fed into the gas recycle system from dispenser 11 thru line 12.

Compounds of the structure $Zn(R_a)(R_b)$, wherein $R_a$ and $R_b$ are the same or different $C_1$ to $C_{14}$ aliphatic or aromatic hydrocarbon radicals, may be used in conjunction with hydrogen, with the catalysts of the present invention, as molecular weight control or chain transfer agents, that is, to increase the melt index values of the copolymers that are produced. About 0 to 100, and preferably about 20 to 30 moles of the Zn compound (as Zn) would be used in the gas stream in the reactor per mol of titanium compound (as Ti) in the reactor. The zinc compound would be introduced into the reactor, preferably in the form of a dilute solution (2 to 30 weight percent) in a hydrocarbon solvent or absorbed on a solid diluent material, such as silica, in amounts of about 10 to 50 weight percent. These compositions tend to be pyrophoric. The zinc compound may be added alone, or with any additional portions of the activator compound that are to be added to the reactor, from a feeder, not shown, which could be positioned adjacent dispenser 11.

It is essential to operate the fluid bed reactor at a temperature below the sintering temperature of the polymer particles to insure that sintering will not occur. For the production of the ethylene copolymers in the process of the present invention an operating temperature of about 30° to 150° C. is generally employed. Temperatures of about 70° to 95° C. are used to prepare products having a density of about 0.91 to 0.92, and temperatures of about 80° to 100° C. are used to prepare products having a density of about >0.92 to 0.94.

The fluid bed reactor is operated at pressures of up to about 1000 psi, and is preferably operated at a pressure of from about 150 to 400 psi, with operation at the higher pressures in such ranges favoring heat transfer since an increase in pressure increases the unit volume heat capacity of the gas.

The partially activated and $SiO_2$ supported precursor composition is injected into the bed at a rate equal to its consumption at a point 13 which is above the distribution plate 8. Preferably, the catalyst is injected at a point in the bed where good mixing of polymer particles occurs. Injecting the catalyst at a point above the distribution plate is an important feature of this invention. Since the catalysts used in the practice of the invention are highly active, injection of the catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots". Injection of the catalyst into the reactor above the bed may result in excessive catalyst carryover into the recycle line where polymerization may begin and plugging of the line and heat exchanger may eventually occur.

A gas which is inert to the catalyst, such as nitrogen or argon, is used to carry the partially reduced precursor composition, and any additional activator compound or non-gaseous chain transfer agent that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas entering the reactor is adjusted upwards and downwards to accommodate the change in rate of heat generation. This insures the maintenance of an essentially constant temperature in the bed. Complete instrumentation of both the fluidized bed and the recycle gas cooling system is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of particulate polymer formation at a constant gas velocity.

The particulate polymer product is preferably continuously withdrawn at a point 14 at or close to the distribution plate 8 and in suspension with a portion of the gas stream which is vented as the particle settle to minimize further polymerization and sintering when the particles reach their ultimate collection zone. The suspending gas may also be used to drive the product of one reactor to another reactor.

The particulate polymer product is conveniently and preferably withdrawn through the sequential operation of a pair of timed valves 15 and 16 defining a segregation zone 17. While valve 16 is closed, valve 15 is opened to emit a plug of gas and product to the zone 17 between it and valve 15 which is then closed. Valve 16 is then opened to deliver the product to an external recovery zone. Valve 16 is then closed to await the next product recovery operation. The vented gas containing unreacted monomers may be recovered from zone 17 through line 18 and recompressed in compressor 19 and returned directly, or through a purifier 20, over line 21 to gas recycle line 6 at a point upstream of the recycle compressor 9.

Finally, the fluidized bed reactor is equipped with an adequate venting system to allow venting the bed during start up and shut down. The reactor does not require the use of stirring means and/or wall scrapping means. The recycle gas line 6 and the elements therein (compressor 9, heat exchanger 10) should be smooth surfaced, and devoid of unnecessary obstructions so as not to impede the flow of recycle gas.

The highly active catalyst system of this invention yield a fluid bed product having an average particle size of about 0.01 to about 0.04 inches, and preferably about 0.02 to about 0.03 inches, in diameter wherein the catalyst residue is unusually low. The polymer particles are relatively easy to fluidize in a fluid bed.

The feed stream of gaseous monomer, with or without inert gaseous diluents, is fed into the reactor at a space time yield of about 2 to 10 pounds/hour/cubic foot of bed volume.

The term virgin resin or polymer as used herein means polymer, in granular form, as it is recovered from the polymerization reactor.

The catalysts of the present invention may also be used in the gas phase reaction process and apparatus disclosed in U.S. patent application Ser. No. 964,989, entitled "Exothermic Polymerization In A Vertical Fluid Bed Reactor System Containing Cooling Means Therein And Apparatus Therefor", and filed Nov. 30, 1978 in the names of Gary L. Brown et al and now U.S. Pat. No. 4,255,542, and which corresponds to European Patent Application No. 79101169.5, which was filed Apr. 17, 1979 and which was published on Oct. 31, 1979 as Publication No. 4966. These applications disclose the use of an entirely straight sided fluid bed reactor which employs heat exchange means within the reactor. The disclosures in these patent applications are incorporated herein by reference.

The following Examples are designed to illustrate the process of the present invention and are not intended as a limitation upon the scope thereof.

The properties of the polymers produced in the Examples were determined by the following test methods:

| | |
|---|---|
| Density | A plaque is made and conditioned for one hour at 100° C. to approach equilibrium crystallinity. Measurement for density is then made in a density gradient column and density values are reported as grams/cm$^3$. |
| Melt Index (MI) | ASTM D-2338 - Condition E - Measured at 190° C. - reported as grams per 10 minutes. |
| Flow Index (HLMI) | ASTM D-1238 - Condition F - Measured at 10 times the weight used in the melt index test above. |
| Melt Flow Ratio (MFR) = $\frac{\text{Flow Index}}{\text{Melt Index}}$ | |
| Productivity | A sample of the resin product is ashed, and the weight % of ash is determined; since the ash is essentially composed of the catalyst, the productivity is thus the pounds of polymer produced per pound of total catalyst consumed. The amount of Ti, Mg and halide in the ash are determined by elemental analysis. |
| Bulk Density | ASTM D-1895 Method B. The resin is poured via ⅜" diameter funnel into a 400 ml graduated cylinder to 400 ml line without shaking the cylinder, and weighed by difference. |
| Molecular Weight Distribution (Mw/Mn) | Gel Permeation Chromatography Styrogel Packing: (Pore Size Sequence is $10^7$, $10^5$, $10^4$, $10^3$, 60 A) Solvent is Perchloro-ethylene at 117° C. Detection: Infra red at 3.45μ. |
| Film Appearance Rating (FAR): | A sample of film is viewed with the naked eye to note the size and distribution of gels or other foreign particles in comparison to standard film samples. The appearance of the film as thus compared to the standard samples is then given a rating on a scale of −100 (very poor) to +100 (excellent). |
| n-hexane extractables | (FDA test used for polyethylene film intended for food contact applications). A 200 square inch sample of 1.5 mil gauge film is cut into strips measuring 1" × 6" and weighed to the nearest 0.1 mg. The strips are placed in a vessel and extracted with 300 ml of n-hexane at 50 ± 1° C. for 2 hours. The extract is then decanted into tared culture dishes. After drying the extract in a vacuum desiccator, the culture dish is weighed to the nearest 0.1 mg. The extractables, normalized with respect to the original sample weight, is then reported as the weight fraction of n-hexane extractables. |
| Unsaturation | Infrared Spectrophotometer (Perkin Elmer Model 21). Pressings made from the resin which are 25 mils in thickness are used as test specimens. Absorbance is measured at 10.35μ for transvinylidene unsaturation, 11.0μ for terminal vinyl unsaturation, and 11.25μ for pendant vinylidene unsaturation. The absorbance per mil of thickness of the pressing is directly proportional to the product of unsaturation concentration and absorbtivity. Absorbtivities are taken from the literature values of R. J. de Kock, et al., J. Polymer Science, Part B, 2, 339 (1964). |
| Average Particle Size | This is calculated from sieve analysis data measured according to ASTM-D-1921 Method A using a 500 g sample. Calculations are based on weight fractions retained on the screens. |

Ia. Preparation of Impregnated Precursor

In a 12 liter flask equipped with a mechanical stirrer are placed 41.8 g (0.439 mol) anhydrous MgCl$_2$ and 2.5 liter tetrahydrofuran (THF). To this mixture, 27.7 g (0.146 mol) TiCl$_4$ is added dropwise over ½ hour. It may be necessary to heat the mixture to 60° C. for about ½ hour in order to completely dissolve the material.

The precursor composition can be isolated from solution by crystallization or precipitation. It may be analyzed at this point for Mg and Ti content since some of the Mg and/or Ti compound may have been lost during the isolation of the precursor composition. The empirical formulas used herein in reporting the precursor compositions are derived by assuming that the Mg and the Ti still exist in the form of the compounds in which they were first added to the electron donor compound. The amount of electron donor is determined by chromatography.

500 g of the silica support, dehydrated to 600° C. to 800° C. and treated with 1 to 8 wt. % triethyl aluminum, is added to the above solution and stirred for ¼ hour. The mixture is dried with a N$_2$ purge at 60° C. to 80° C. for about 3–5 hours to provide a dry free flowing powder having the particle size of the silica. The absorbed precursor composition has the formula

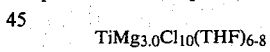

Ib. Preparation of Impregnated Precursor from Preformed Precursor Composition

In a 12 liter flask equipped with a mechanical stirrer, 130 g precursor composition is dissolved in 2.5 liters dry THF. The solution may be heated to 60° C. in order to facilitate dissolution. 500 g of the silica support, dehydrated to 600° C. to 800° C. and treated with 1 to 8 wt % triethyl aluminum, is added and the mixture is stirred for ¼ hour. The mixture is dried with a N$_2$ purge at 60° C. to 80° C. for about 3–5 hours to provide a dry free flowing powder having the particle size of the silica.

II. Activation Procedure

The desired weights of impregnated precursor composition and activator compound are added to a mixing tank with sufficient amounts of anhydrous aliphatic hydrocarbon diluent which as isopentane to provide a slurry system.

The activator compound and precursor compound are used in such amounts as to provide a partially activated precursor composition which has an Al/Ti ratio of >0 to 21 10:1 and preferably of 4 to 8:1.

The contents of the slurry system are then thoroughly mixed at room temperature and at atmospheric pressure for about ¼ to ½ hour. The resulting slurry is then dried under a purge of dry inert gas, such as nitrogen or argon, at atmospheric pressure and at a temperature of 65°±10° C. to remove the hydrocarbon diluent. This process usually requires about 3 to 5 hours. The resulting catalyst is in the form of a partially activated precursor composition which is impregnated within the pores of the silica. The material is a free flowing particulate material having the size and shape of the silica. It is not pyrophobic unless the aluminum alkyl content exceeds a loading of 10 weight percent. It is stored under a dry inert gas, such as nitrogen or argon, prior to future use. It is now ready for use and injected into, and fully activated within, the polymerization reactor.

When additional activator compound is fed to the polymerization reactor for the purpose of completing the activation of the precursor composition, it is fed into the reactor as a dilute solution in a hydrocarbon solvent such as isopentane. These dilute solutions contain about 2 to 30% by weight of the activator compound.

The activator compound is added to the polymerization reactor so as to maintain the Al/Ti ratio in the reactor at a level of about ≧10 to 400:1, and preferably of 15 to 60:1.

EXAMPLES 1 TO 6

Ethylene was copolymerized with butene-1 in each of this series of 6 examples.

In each of the examples, the catalyst used was formed as described above in preparation Ia so as to form a silica impregnated catalyst system containing 20% to 23% of precursor composition. The silica used in Example 1 was unscreened MS 1D Grade 952 silica available from Davison Chemical Division, W. R. Grace and Company. The silica of Example 2 was a coarse fraction of Davison MS 1D Grade 952 silica which after fractionation was retained on 60, 80 and 120 mesh size U.S. Standard screens. Examples 3 employed a fine fraction of the Davison MS 1D Grade 952 silica which had passed through a 230 mesh size U.S. Standard screen. Examples 4, 5 and 6 employed unscreened Crossfield Company Ltd.'s Grade EP-10 silica, Akzo Chemie Ltd.'s "Ketjen" Grade F-7 silica, and U.S.I. Chemical Co.'s "Polypor" silica, respectively ("Ketjen" and "Polypor" are registered trademarks). The silica carriers employed in each of the examples, as well as the average particle size and particle size distribution of such carriers, are summarized in Table I below, along with the titanium and tetrahydrofuran content of the impregnated carriers.

TABLE I

| | Example | | | | | |
|---|---|---|---|---|---|---|
| | 1 (a) | 2 (b) | 3 (c) | 4 (d) | 5 (e) | 6 (f) |
| Silica Carrier | | | | | | |
| Screen analysis, weight % | | | | | | |
| Screen size | | | | | | |
| 60 mesh (297 microns) | 0 | | 0 | 0 | 0 | 0 |
| 80 mesh (177 microns) | 5.0 | 100 | 0 | 8.4 | 12.0 | 9.7 |
| 120 mesh (125 microns) | 5.5 | | 0 | 27.0 | 16.0 | 23.0 |
| 170 mesh (88 microns) | 20.0 | 0 | 0 | 41.8 | 31.0 | 39.1 |
| 230 mesh | 34.5 | 0 | 0 | 18.4 | 21.0 | 17.1 |

TABLE I-continued

| | Example | | | | | |
|---|---|---|---|---|---|---|
| | 1 (a) | 2 (b) | 3 (c) | 4 (d) | 5 (e) | 6 (f) |
| (63 microns) | | | | | | |
| 325 mesh (44 microns) | 17.5 | 0 | 100 | 4.1 | 11.0 | 6.4 |
| pan (<44 microns) | 17.5 | 0 | | 0.3 | 9.0 | 4.7 |
| Average particle size, microns | 81 | 180 | 35 | 115 | 105 | 114 |
| Impregnated Carrier | | | | | | |
| Ti, mmol/g | 0.234 | 0.242 | 0.236 | 0.234 | 0.242 | 0.221 |
| THF, wt. % | 12.94 | 9.93 | 9.14 | 11.22 | 10.07 | 10.86 |

(a) Unscreened MS 1D Grade 952 (Davison Chemical Division, W. R. Grace and Co.)
(b) Coarse fraction of MS 1D Grade 952
(c) Fine fraction of MS 1D Grade 952
(d) Unscreened Grade EP-10 (Crosfield Company Ltd.)
(e) Unscreened "Ketjen" F-7 (Akzo Chemie Ltd.)
(f) Unscreened "Polypor" (U.S.I. Chemical Co.)

In each example, the silica impregnated precursor composition was partially activated with tri-n-hexyl aluminum, as described in procedure II above, so as to provide a catalyst composition having an Al/Ti mol ratio of 5±1. The completion of the activation of the precursor composition in the polymerization reactor was accomplished with a 5% by weight solution of triethyl aluminum in isopentane so as to provide a completely activated catalyst in the reactor with an Al/Ti mol ratio of 25 to 40.

Each of the polymerization reactions was conducted for 48 hours at 85° C. and under a pressure of 300 psig, a gas velocity of about 3 to 6 times Gmf, and a space time yield of about 4.8 to 6.5 in a fluid bed reactor system. The reaction system was as described in the drawing above. It has a lower section 10 feet high and 13½ inches in (inner) diameter, and an upper section which was 16 feet high and 23½ inches in (inner) diameter.

Table II below lists the butene-1/ethylene molar ratio and H$_2$/ethylene molar ratio and the space time yield (lbs/hr/ft$^3$ of bed space) used in each example, as well as the various properties of the polymers made in such examples, and various properties of film samples made from such polymers.

TABLE II

| Example | 1 | 2 | 3 | 4 | 5 | 6 |
|---|---|---|---|---|---|---|
| Operating Conditions | | | | | | |
| C$_4$/C$_2$ mol ratio | 0.382 | 0.365 | 0.356 | 0.347 | 0.352 | 0.344 |
| H$_2$/C$_2$ mol ratio | 0.171 | 0.159 | 0.177 | 0.183 | 0.181 | 0.170 |
| Space time yield (lbs/hr/ft$^3$ bed space) | 6.5 | 5.9 | 5.3 | 4.8 | 5.0 | 5.0 |
| Polymer Properties | | | | | | |
| Melt index | 2.15 | 1.5 | 1.90 | 2.68 | 2.60 | 1.95 |
| Melt flow ratio | 25.7 | 27.2 | 24.5 | 28.5 | 24.3 | 26.1 |
| Density (g/cc) | 0.9212 | 0.9215 | 0.9229 | 0.9214 | 0.9223 | 0.9214 |
| Ti, ppm | 7 | 6 | 3 | 5 | 2 | 3 |
| % ash | 0.05 | 0.05 | 0.019 | 0.043 | — | 0.011 |
| Granular Properties | | | | | | |
| Bulk density, lbs/cu. ft. | 21.0 | 21.5 | 25.1 | 16.7 | 17.2 | 24.5 |
| Screen analysis, | | | | | | |

TABLE II-continued

| Example | 1 | 2 | 3 | 4 | 5 | 6 |
|---|---|---|---|---|---|---|
| weight % | | | | | | |
| Screen size | | | | | | |
| 10 mesh (0.0110") | 7.1 | 9.7 | 0.6 | 37.8 | 32.7 | 6.5 |
| 18 mesh (0.0555") | 45.6 | 54.0 | 7.2 | 48.0 | 48.7 | 49.9 |
| 35 mesh (0.0278") | 40.2 | 32.9 | 55.1 | 12.1 | 17.4 | 39.1 |
| 60 mesh (0.139") | 6.7 | 3.4 | 34.7 | 1.5 | 1.2 | 4.5 |
| 120 mesh (0.0070") | 0.4 | 0 | 2.2 | 0.6 | 0 | 0 |
| 200 mesh (0.0041") | 0 | 0 | 0.2 | 0 | 0 | 0 |
| pan | 0 | 0 | 0 | 0 | 0 | 0 |
| Average particle size, in. | 0.0453 | 0.0503 | 0.0249 | 0.0733 | 0.0683 | 0.0460 |
| Film Properties | | | | | | |
| Film apperance rating | −30 | −30 | +10 | <−25 >−30 | <−30 >−40 | <−10 >−20 |

As compared to granular copolymers made in co-pending application Ser. No. 012,720, filed on Feb. 16, 1979 in the names of George Leonard Goeke, Burkhard Eric Wagner and Frederick John Karol, entitled "Impregnated Polymerization Catalyst, Process for Preparing, And Use For Ethylene Copolymerization", the copolymers of the present invention, in virgin powder form, and at a given density and melt index, have a smaller average particle size, higher bulk densities, and lower catalyst residues. In film form, the copolymers made by the process of the present invention have improved film properties compared to the copolymers made in said copending application.

EXAMPLES 7 TO 9

Ethylene was copolymerized with butene-1 in each of these series of examples.

In these examples the procedure of Examples 1 to 6 was repeated at a pressure of 400 psig employing various sized silica particles as the precursor carrier. The silica used in Example 7 was unscreened Davison MS 1D Grade 952 silica. The silica of Example 8 was a mid fraction of Davison MS 1D Grade 952 silica which had passed through a 120 mesh size U.S. Standard screen and was retained on a 170 and 230 mesh size U.S. Standard screen. Example 9 employed a fine fraction of the Davison MS 1D Grade 952 silica which had passed through a 230 mesh size U.S. Standard screen. The silica carriers employed in each of the examples, as well as the average particle size and particle size distribution of such carriers, are summarized in Table III below, along with the titanium and tetrahydrofuran content of the impregnated carriers. Table IV below lists the butene-1/ethylene molar ratio and H₂/ethylene molar ratio and the space time yield (lbs/hr/ft³ of bed space) used in each example, as well as the various properties of the polymers made in such examples, and the various properties of film samples made from such polymers.

TABLE III

| | Example | | |
|---|---|---|---|
| | 7 (a) | 8 (b) | 9 (c) |
| Silica Carrier | | | |
| Screen Analysis, weight % | | | |
| Screen size | | | |
| 60 mesh (297 microns) | 0 | 0 | 0 |
| 80 mesh (177 microns) | 5.0 | 0 | 0 |
| 120 mesh (125 microns) | 5.5 | 0 | 0 |
| 170 mesh (88 microns) | 20.0 | 100 | 0 |
| 230 mesh (63 microns) | 34.5 | | 0 |
| 325 mesh (44 microns) | 17.5 | 0 | 100 |
| pan (<44 microns) | 17.5 | 0 | |
| Average particle size, microns | 81 | 86 | 35 |
| Impregnated Carrier | | | |
| Ti, mmol/g | 0.235 | 0.231 | 0.230 |
| THF, wt. % | 11.18 | 9.00 | 9.56 |

(a) Unscreened MS 1D Grade 952 (Davison Chemical Division, W. R. Grace and Co.)
(b) Mid fraction of MS 1D Grade 952
(c) Fine fraction of MS 1D Grade 952

TABLE IV

| Example | 7 | 8 | 9 |
|---|---|---|---|
| Operating Conditions | | | |
| C₄/C₂ mol ratio | 0.352 | 0.366 | 0.353 |
| H₂/C₂ mol ratio | 0.169 | 0.166 | 0.154 |
| Space time yield (lbs/hr/ft³ bed space) | 6.3 | 5.9 | 6.3 |
| Polymer Properties | | | |
| Melt index | 2.0 | 2.50 | 2.40 |
| Melt flow ratio | 24.3 | 25.2 | 23.7 |
| Density (g/cc) | 0.9223 | 0.9216 | 0.9221 |
| Ti, ppm | 2 | 5 | 3 |
| % ash | 0.026 | 0.068 | 0.04 |
| Granular Properties | | | |
| Bulk density, lbs/cu. ft. | 22.7 | 23.9 | 26.0 |
| Screen analysis, weight % | | | |
| Screen size | | | |
| 10 mesh (0.0110") | 15.5 | 0.4 | 0 |
| 18 mesh (0.0555") | 52.9 | 27.4 | 7.9 |
| 35 mesh (0.0278") | 28.7 | 55.5 | 54.1 |
| 60 mesh (0.0139") | 2.9 | 16.2 | 36.4 |
| 120 mesh (0.0070") | 0 | 0.5 | 1.6 |
| 200 mesh (0.0041") | 0 | 0 | 0 |
| pan | 0 | 0 | 0 |
| Average particle size, in. | 0.0548 | 0.0333 | 0.0245 |
| Film Properties | | | |
| Film appearance rating | −10 | −20 | +25 |

EXAMPLES 10 TO 11

Ethylene was copolymerized with butene-1 in each of two examples.

In both examples the procedure of Examples 1 to 6 was repeated in a large commercial reactor at a pressure of 270 psig employing different sized silica particles as the precursor carrier. The silica used in Example 10 was unscreened Davison MS 1D Grade 952 silica. Example 11 employed a fine fraction of the Davision MS 1D Grade 952 silica which had been separated by air classification. The separated fraction was capable of passing through a 230 mesh size U.S. Standard screen. The silica carriers employed in each of the examples, as well as the average particle size and particle size distribution of such carriers, are summarized in Table V below, along with the titanium and tetrahydrofuran content of the impregnated carriers. Table VI below lists the butene-1/ethylene molar ratio and H₂/ethylene molar ratio and the space time yield (lbs/hr/ft³ of bed space) used in each example, as well as the various properties of the polymers made in such examples, and the various properties of film samples made from such polymers.

TABLE V

| | Example | |
|---|---|---|
| | 10 (a) | 11 (b) |
| Silica Carrier | | |
| Screen analysis, weight % | | |
| Screen size | | |
| 60 mesh (297 microns) | 0 | 0 |
| 80 mesh (177 microns) | 5.0 | 0 |
| 120 mesh (125 microns) | 5.5 | 0 |
| 170 mesh (88 microns) | 20.0 | 0 |
| 230 mesh (63 microns) | 34.5 | 0 |
| 325 mesh (44 microns) | 17.5 | 100 |
| pan (<44 microns) | 17.5 | |
| Average particle size, microns | 81 | 22 |
| Impregnated Carrier | | |
| Ti, mmol/g | 0.215 | 0.217 |
| THF, wt. % | 10.0 | 9.6 |

(a) Unscreened MS 1D Grade 952 (Davison Chemical Division, W. R. Grace and Co.)
(b) Fine fraction of MS 1D Grade 952

TABLE VI

| Example | 10 | 11 |
|---|---|---|
| Operating Conditions | | |
| $C_4/C_2$ mol ratio | 0.47 | 0.48 |
| $H_2/C_2$ mol ratio | 0.18 | 0.18 |
| Space time yield (lbs/hr/ft³ bed space) | 6.0 | 6.0 |
| Polymer Properties | | |
| Melt index | 1.7 | 2.2 |
| Melt flow ratio | 26.5 | 26.0 |
| Density (g/cc) | 0.920 | 0.920 |
| Ti, ppm | 3 | 2 |
| % ash | 0.031 | 0.020 |
| Granular Properties | | |
| Bulk density, lbs/cu. ft. | 25.5 | 26.6 |
| Screen analysis, weight % | | |
| Screen size | | |
| 10 mesh (0.0110") | 4.0 | 3.2 |
| 18 mesh (0.0555") | 36.1 | 8.4 |
| 35 mesh (0.0278") | 36.4 | 24.4 |
| 60 mesh (0.0139") | 17.0 | 40.4 |
| 120 mesh (0.0070") | 6.0 | 20.9 |
| 200 mesh (0.0041") | 0.5 | 2.6 |
| pan | 0 | 0.1 |
| Average particle size, in. | 0.0379 | 0.0225 |
| Film Properties | | |
| Film appearance rating | 0 | +40 |

What is claimed is:

1. In a catalyst composition for copolymerizing ethylene with one or more $C_3$ to $C_8$ alpha olefins at a productivity level of $\leq 5$ ppm of titanium per million parts of copolymer comprising a precursor composition of the formula $$Mg_mTi_1(OR)_nX_p[ED]_q$$

wherein
R is a $C_1$ to $C_{14}$ aliphatic or aromatic hydrocarbon radical, or $COR'$ wherein $R'$ is a $C_1$ to $C_{14}$ aliphatic or aromatic hydrocarbon radical,
X is selected from the group consisting of Cl, Br, I or mixtures thereof,
ED is an electron donor compound,
m is $\geq 0.5$ to $\leq 56$,
n is 0, 1 or 2,
p is $\geq 2$ to $\leq 116$, and
q is $\geq 2$ to $\leq 85$,
said precursor composition being impregnated in a porous support in a weight ratio of 0.1:1 to 0.33:1 and being either unactivated, or
partially activated with $>0$ to $<10$ mols of activator compound per mol of Ti in said precursor composition or completely activated with $\geq 10$ to $\leq 400$ mols of activator compound per mol of Ti in said precursor composition,
said activator compound having the formula $$Al(R'')_cX'_dH_e$$

wherein $X'$ is Cl or $OR'''$, $R''$ and $R'''$ are the same or different and are $C_1$ to $C_{14}$ saturated hydrocarbon radicals, d is 0 to 1.5, e is 1 or 0 and $c+d+e=3$,
and said electron donor compound being a liquid organic compound in which said precursor composition is soluble and which is selected from the group consisting of alkyl esters of aliphatic and aromatic carboxylic acids, aliphatic ethers, cyclic ethers and aliphatic ketones,
the improvement which comprises employing as said support silica having a particle size distribution within the range of from 2 microns to 80 microns and an average particle size of from 20 microns to 50 microns.

2. A catalyst composition as in claim 1 wherein no more than 15 percent by weight of the silica support has a particle size below 10 microns.

3. A catalyst composition as in claim 1 wherein no more than 5 percent by weight of the silica support has a particle size below 5 microns and no more than 10 percent by weight of the silica support has a particle size greater than 65 microns.

4. A catalyst composition as in claim 3 wherein no more than 15 percent by weight of the silica support has a particle size below 10 microns.

5. A catalyst composition as in claim 1 wherein the silica support has a particle size distribution within the range of from 5 microns to 65 microns and an average particle size of from 25 microns to 45 microns.

6. A catalyst composition as in claim 5 wherein no more than 15 percent by weight of the silica support has a particle size below 10 microns.

7. A catalyst composition as in any one of claims 1, 3, or 5 wherein the source of the Mg in said composition comprises $MgCl_2$.

8. A catalyst composition as in claim 7 in which the electron donor compound comprises at least one ether.

9. A catalyst composition as in claim 7 in which the electron donor compound comprises tetrahydrofuran.

10. A catalyst composition as in any one of claims 1, 3 or 5 wherein the source of the Mg in said composition comprises $MgCl_2$ and the source of the Ti in said composition comprises $TiCl_4$.

11. A catalyst composition as in claim 10 in which the electron donor compound comprises at least one ether.

12. A catalyst composition as in claim 10 in which the electron donor comprises tetrahydrofuran.

13. In a process for preparing a catalyst composition for copolymerizing ethylene with one or more $C_3$ to $C_8$ alpha olefins at a productivity level of $\leq 5$ ppm of titanium per million parts of copolymer which comprises
(A) forming a precursor composition of the formula $$Mg_mTi_1(OR)_nX_p[ED]_q$$

wherein

R is a $C_1$ to $C_{14}$ aliphatic or aromatic hydrocarbon radical, or COR' wherein R' is a $C_1$ to $C_{14}$ aliphatic or aromatic hydrocarbon radical, X is selected from the group consisting of Cl, Br, I or mixtures thereof, ED is an electron donor compound, m is $\geq 0.5$ to $\leq 56$, n is 0, 1, or 2, p is $\geq 2$ to $\leq 116$, and q is $\geq 2$ to $\leq 85$, by dissolving at least one magnesium compound and at least one titanium compound in at least one electron donor compound so as to thereby form a solution of said precursor composition in said electron donor compound, and recovering said precursor composition from said solution, said magnesium compound having the structure $MgX_2$, said titanium compound having the structure $Ti(OR)_aX_b$, wherein a is 0, 1 or 2, b is 1 to 4 inclusive and $a+b=3$ or 4, said electron donor compound being a liquid organic compound in which said magnesium compound and said titanium compound are soluble and which is selected from the group consisting of alkyl esters of aliphatic and aromatic carboxylic acids, aliphatic ethers, cyclic ethers and aliphatic ketones, said magnesium compound, said titanium compound and said electron donor compound being employed in such amounts as to satisfy the values of m, n, p and q, (B) impregnating said precursor composition onto a porous support in a weight ratio of 0.1:1 to 0.33:1, either before or after recovering said precursor composition from the electron donor solution thereof, and (C) partially activating said precursor composition with >0 to <10 mols of activator compound per mol of Ti in said precursor composition, said activator compound having the formula $Al(R'')_cX'_dH_e$ wherein X' is Cl or OR''', R'' and R''' are the same or different and are $C_1$ to $C_{14}$ saturated hydrocarbon radicals, d is 0 to 1.5, e is 1 or 0 and $c+d+e=3$, said activating being conducted after the recovery of said impregnated precursor composition from the electron donor solution thereof, the improvement which comprises employing as said support silica having a particle size distribution within the range of from 2 microns to 80 microns and an average particle size of from 20 microns to 50 microns.

14. A process as in claim 13 wherein no more than 15 percent by weight of the silica support has a particle size below 10 microns.

15. A process as in claim 13 wherein no more than 5 percent by weight of the silica support has a particle size below 5 microns and no more than 10 percent by weight of the silica support has a particle size greater than 65 microns.

16. A process as in claim 15 wherein no more than 15 percent by weight of the silica support has a particle size below 10 microns.

17. A process as in claim 13 wherein the silica support has a particle size distribution within the range of from 5 microns to 65 microns and an average particle size of from 25 microns to 45 microns.

18. A process as in claim 17 wherein no more than 15 percent by weight of the silica support has a particle size below 10 microns.

19. A process as in any one of claims 13, 15 or 17 wherein the source of the Mg in said composition comprises $MgCl_2$.

20. A process as in claim 19 in which the electron donor compound comprises at least one ether.

21. A process as in claim 19 in which the electron donor compound comprises tetrahydrofuran.

22. A process as in any one of claims 13, 15 or 17 wherein the source of the Mg in said composition comprises $MgCl_2$ and the source of the Ti in said composition comprises $TiCl_4$.

23. A process as in claim 22 in which the electron donor compound comprises at least one ether.

24. A process as in claim 22 in which the electron donor compound comprises tetrahydrofuran.

25. A process as in claim 13, 15 or 17 in which said partially activated impregnated precursor composition is completely activated in a polymerization reactor with $\geq 10$ to $\leq 400$ mols of said activator compound per mol of titanium compound in said precursor composition.

* * * * *

UNITED STATES PATENT AND TRADEMARK OFFICE
CERTIFICATE OF CORRECTION

PATENT NO. : 4,405,495

DATED : September 20, 1983

INVENTOR(S) : Kiu H. Lee et al.

It is certified that error appears in the above-identified patent and that said Letters Patent is hereby corrected as shown below:

Cover sheet, column 2, last line of the Abstract, insert a semi-colon (;) between "0" and "and".

Column 1, line 14, "Mar. 3, 1979" should read - - Mar. 30, 1979 - -.

Column 5, line 59, "increase" should read - - increased - -.

Column 7, line 17, "dyring" should read - - drying - -.

Column 8, line 68, "$M_2$/Mn" should read - - Mw/Mn - -.

Column 9, line 4, "have" should read - - and - -.

Column 9, line 6, "Elmendorft" should read - - Elmendorf - -.

Column 10, line 41, "Nos." should read - - No. - -.

Column 11, line 16, "150°C." should read - - 105°C. - -.

Column 12, line 14, "particle" should read - - particles - -.

Column 12, line 60, insert a comma (,) after "al".

Column 14, line 13, "2" should read - - $\underline{2}$ - -.

Column 14, line 68, "21 10:1" should read - - < 10:1 - -.

Column 15, line 40, "Examples" should read - - Example - -.

UNITED STATES PATENT AND TRADEMARK OFFICE
CERTIFICATE OF CORRECTION

PATENT NO. : 4,405,495

DATED : September 20, 1983

INVENTOR(S) : Kiu H. Lee et al.

It is certified that error appears in the above-identified patent and that said Letters Patent is hereby corrected as shown below:

Column 15, Table I, the lettering (a) (b), (c), (d), (e) and (f) should appear opposite the words "Silica Carrier".

Column 17, line 30, before "the" insert - - now U.S. Patent 4,302,565, - -.

Column 17, Table III, the lettering (a), (b), and (c) should appear opposite the words "Silica Carrier".

Column 19, Table V, the lettering (a) and (b) should appear opposite the words "Silica Carrier".

Column 19, Table VI, line 38, "26.6" should read - - 26.5 - -.

Signed and Sealed this

First Day of January 1985

[SEAL]

Attest:

GERALD J. MOSSINGHOFF

*Attesting Officer*     *Commissioner of Patents and Trademarks*